(12) United States Patent
Tang et al.

(10) Patent No.: US 11,520,330 B2
(45) Date of Patent: Dec. 6, 2022

(54) SWEEPING ROBOT OBSTACLE AVOIDANCE TREATMENT METHOD BASED ON FREE MOVE TECHNOLOGY

(71) Applicant: SHENZHEN UMOUSE TECHNOLOGY CO., LTD., Shenzhen (CN)

(72) Inventors: Chaohui Tang, Shenzhen (CN); Haiming Zuo, Shenzhen (CN); Tao Xie, Shenzhen (CN)

(73) Assignee: SHENZHEN UMOUSE TECHNOLOGY CO., LTD., Shenzhen (CN)

( * ) Notice: Subject to any disclaimer, the term of this patent is extended or adjusted under 35 U.S.C. 154(b) by 299 days.

(21) Appl. No.: 16/726,278

(22) Filed: Dec. 24, 2019

(65) Prior Publication Data
US 2021/0116909 A1    Apr. 22, 2021

(30) Foreign Application Priority Data

Oct. 21, 2019    (CN) .......................... 201910999232.5

(51) Int. Cl.
*G05D 1/00*    (2006.01)
*A47L 11/24*    (2006.01)
(Continued)

(52) U.S. Cl.
CPC ............ *G05D 1/0055* (2013.01); *A47L 11/24* (2013.01); *A47L 11/4061* (2013.01);
(Continued)

(58) Field of Classification Search
CPC .. G05D 1/0055; G05D 1/0022; G05D 1/0214; G05D 2201/0203; A47L 11/24;
(Continued)

(56) References Cited

U.S. PATENT DOCUMENTS

2003/0233198 A1*  12/2003  Taguchi ................. G06F 17/18
                                                          702/182
2005/0166357 A1    8/2005  Uehigashi
(Continued)

FOREIGN PATENT DOCUMENTS

CN    101196744 A    6/2008
CN    107065881 A    8/2017
(Continued)

OTHER PUBLICATIONS

First Office Action issued in counterpart Chinese Patent Application No. 201910999232.5, dated Dec. 3, 2020.
(Continued)

*Primary Examiner* — Khoi H Tran
*Assistant Examiner* — Aaron G Cain
(74) *Attorney, Agent, or Firm* — Westbridge IP LLC

(57) ABSTRACT

The present disclosure provides a sweeping robot obstacle avoidance treatment method based on free move technology, step 1 and step 2 are as following. Step 1: predetermining a sweeping robot provided with a six-axis gyroscope, a grating signal sensor, and a left-and-right-wheel electric quantity sensing unit. Step 2: performing a real-time sensing and data acquisition on an operation state of the sweeping robot by utilizing the six-axis gyroscope, the grating signal sensor, and the left-and-right wheel electric quantity sensing unit to obtain a real-time data information.

4 Claims, 4 Drawing Sheets

Sampling basic data, respectively sampling the data classification results, classifying a sampling information by a mathematical statistics method of obtaining the data classification results, and identifying the operation states of the sweeping robot by the Mahalanobis distance calculation method — S401

If the sweeping robot detects that the first collision data, the second collision data, or the third area collision data are triggered, generating a collision signal by the sweeping robot, timely identifying the collision signal as the sweeping robot is in a seventh collision state by an internal data sensing and a sending program of the sweeping robot, and controlling corresponding components to perform a pre-treating operation by the controller — S402

By identifying an actual threshold state of the threshold passing state of the sweeping robot, defining that the sweeping robot does not cross over the threshold if a threshold value of the threshold is higher than a predetermined threshold value; defining that the sweeping robot keeps passing through if the threshold value is lower than the predetermined threshold value — S403

(51) Int. Cl.
*A47L 11/40* (2006.01)
*G05D 1/02* (2020.01)
*H04W 4/20* (2018.01)

(52) U.S. Cl.
CPC ......... *G05D 1/0022* (2013.01); *G05D 1/0214* (2013.01); *A47L 2201/04* (2013.01); *G05D 2201/0203* (2013.01); *H04W 4/20* (2013.01)

(58) Field of Classification Search
CPC ... A47L 11/4061; A47L 2201/04; H04W 4/20
See application file for complete search history.

(56) References Cited

U.S. PATENT DOCUMENTS

| | | | |
|---|---|---|---|
| 2012/0173070 A1 | 7/2012 | Schnittman | |
| 2013/0138247 A1* | 5/2013 | Gutmann | G01S 17/06 901/1 |
| 2015/0158182 A1* | 6/2015 | Farlow | G05D 1/0274 901/1 |
| 2017/0049286 A1* | 2/2017 | Ziegler | A47L 9/2884 |
| 2018/0052177 A1* | 2/2018 | Atzori | G01N 33/64 |
| 2018/0165554 A1* | 6/2018 | Zhang | G06K 9/6256 |
| 2019/0072963 A1* | 3/2019 | Schnittman | G05D 1/0227 |
| 2019/0104908 A1* | 4/2019 | He | A46B 13/001 |

FOREIGN PATENT DOCUMENTS

| | | |
|---|---|---|
| CN | 107092260 A | 8/2017 |
| CN | 109407653 A | 3/2019 |
| CN | 109674404 A | 4/2019 |
| CN | 209172200 U | 7/2019 |

OTHER PUBLICATIONS

Invitation pursuant to Rule 63(1) EPC issued in counterpart European Patent Application No. 20165375.5, dated Apr. 8, 2021.
Office Action issued in counterpart European Patent Application No. 20165375.5, dated Aug. 16, 2021.

* cited by examiner

SWEEPING ROBOT OBSTACLE AVOIDANCE TREATMENT METHOD BASED ON FREE MOVE TECHNOLOGY

TECHNICAL FIELD

The present disclosure relates to a technical filed of a sweeping robot obstacle avoidance treatment method, in particular to a sweeping robot obstacle avoidance treatment method based on free move technology, which is high in accuracy and effectively improves operation stability.

BACKGROUND

In recent years, products of sweeping robots are rapidly popularized and applied, which provides a lot of convenience in daily life of human beings. The products of sweeping robots are high in flexibility and clean indoor ground according to a predetermined track, which are deeply loved by users.

However, the present products of sweeping robots still exist disadvantages. For example, functions are not insufficient and cannot meet certain special use requirements of human beings, an intelligent degree is low, and obstacle avoidance ability is not good enough, and so on, which restrict better popularization and use of the products.

Based on above, those skilled in the field perform a lot of research and developments and experiments, and a good performance is obtained.

SUMMARY

In order to overcome problems existed in the prior art, the present disclosure provides a sweeping robot obstacle avoidance treatment method based on free move technology, which is high in accuracy and effectively improves running stability of the sweeping robot.

Comparing with the prior art, the present disclosure provides the sweeping robot obstacle avoidance treatment method based on free move technology. The sweeping robot obstacle avoidance treatment method based on free move technology that defines the sweeping robot having a six-axis gyroscope as a signal sensor and a grating signal and a left-right wheel electric quantity as auxiliary signals, which accurately identifies four states of the sweeping robot. The four states of the sweeping robot include a collision state, an obstacle-free state, an over-threshold state, and an obstacle pushing state. Through experimental verification, accuracy of the identification of the four states of the sweeping robot reaches more than 96%, so that the sweeping robot freely sweeps at home, and keeps running without getting blocked.

DETAILED DESCRIPTION

In order to make objectives, technical solutions and advantages of the present disclosure more comprehensible, the present disclosure is further described in further detail with reference to the accompany drawings and embodiments. It should be understood that the specific embodiments described herein are merely illustrative of the present disclosure and are not intended to limit the present disclosure.

Figure 1:
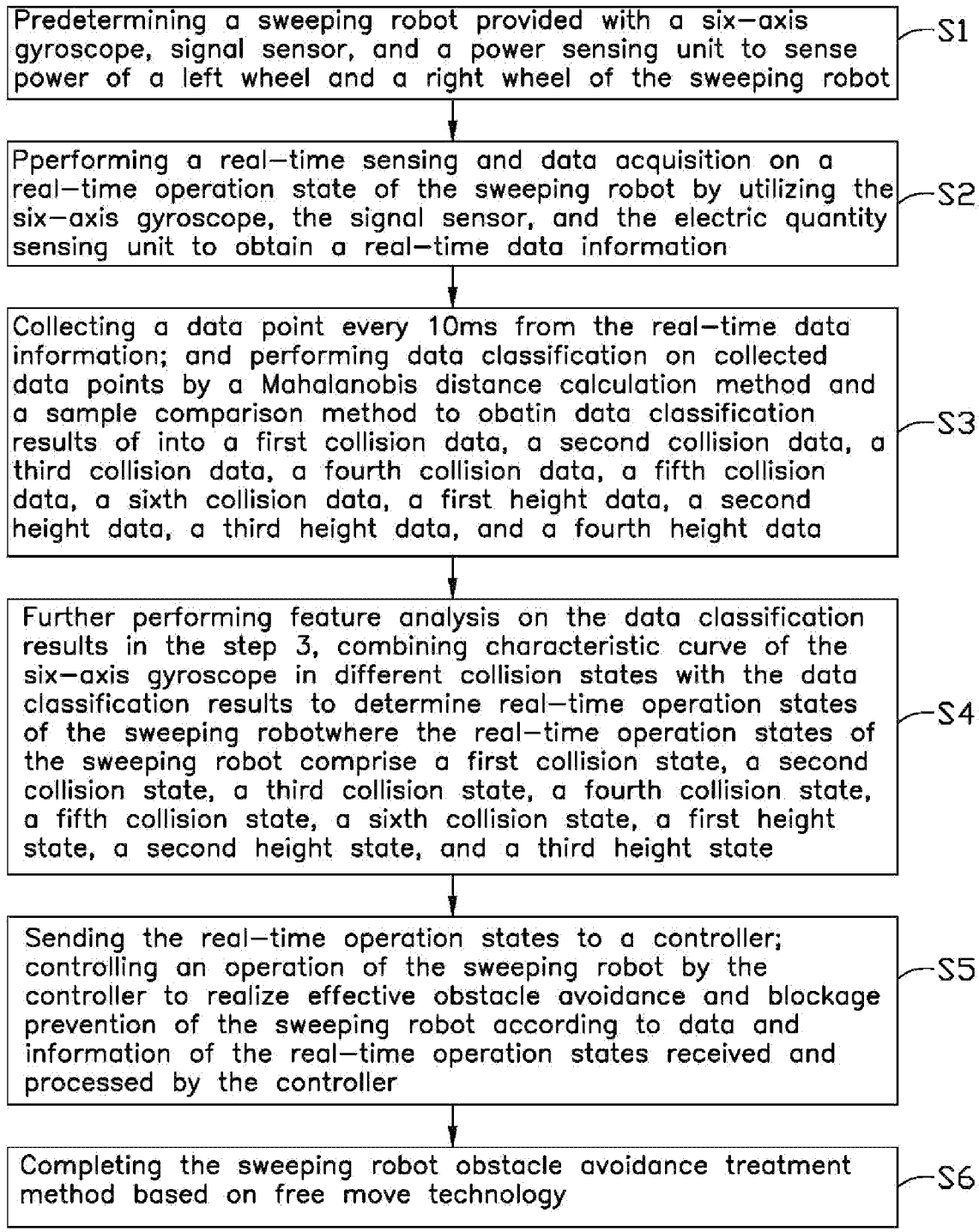
FIG. 1 is a schematic flow diagram of steps 1-4 of a sweeping robot obstacle avoidance treatment method based on free move technology of the present disclosure.
Figure 2:
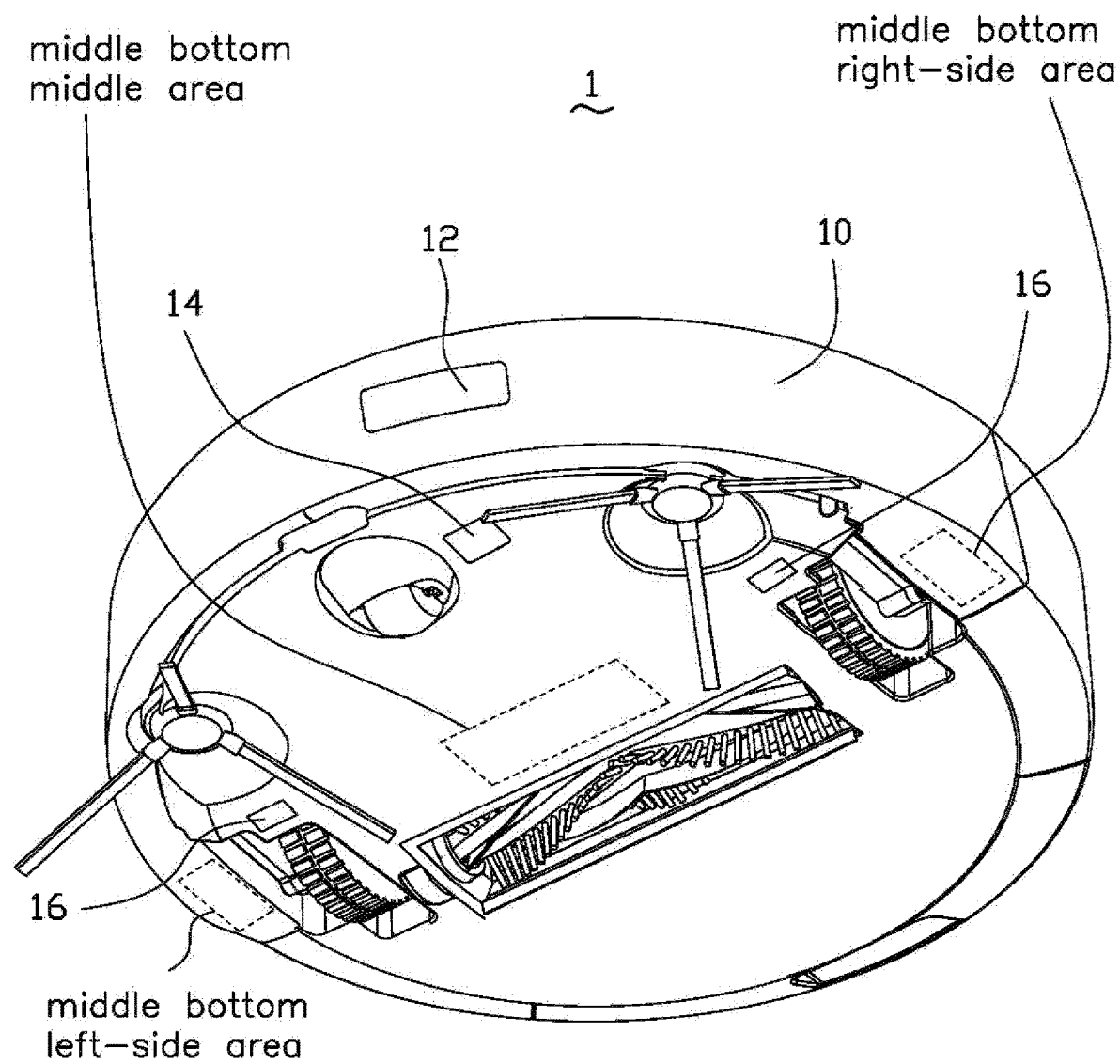
FIG. 2 is a schematic diagram of a sweeping robot shown in a first presentation angle according to one embodiment of the present disclosure.
Figure 3:
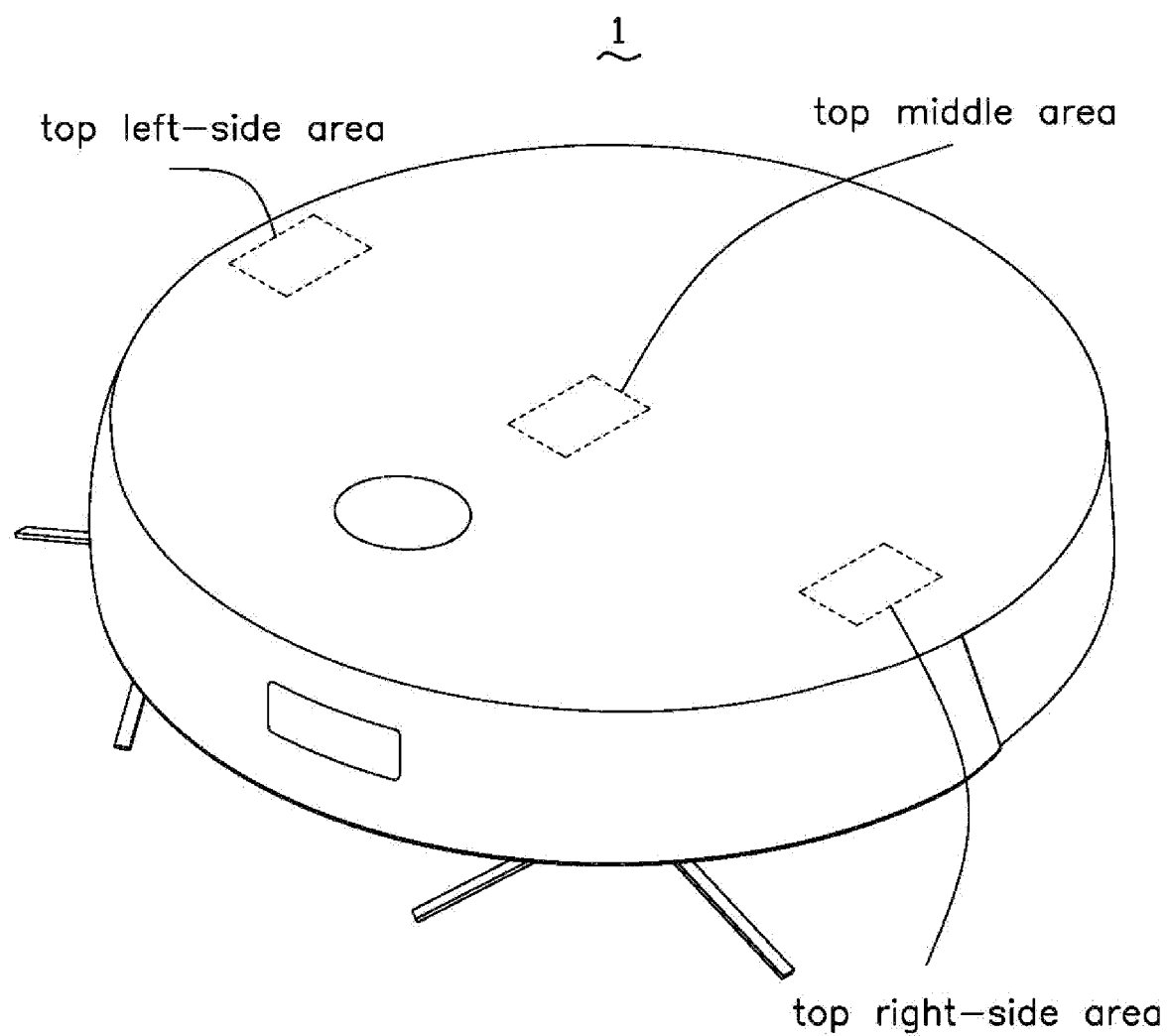
FIG. 3 is a schematic diagram of the sweeping robot shown in a second presentation angle according to one embodiment of the present disclosure.
Figure 4:
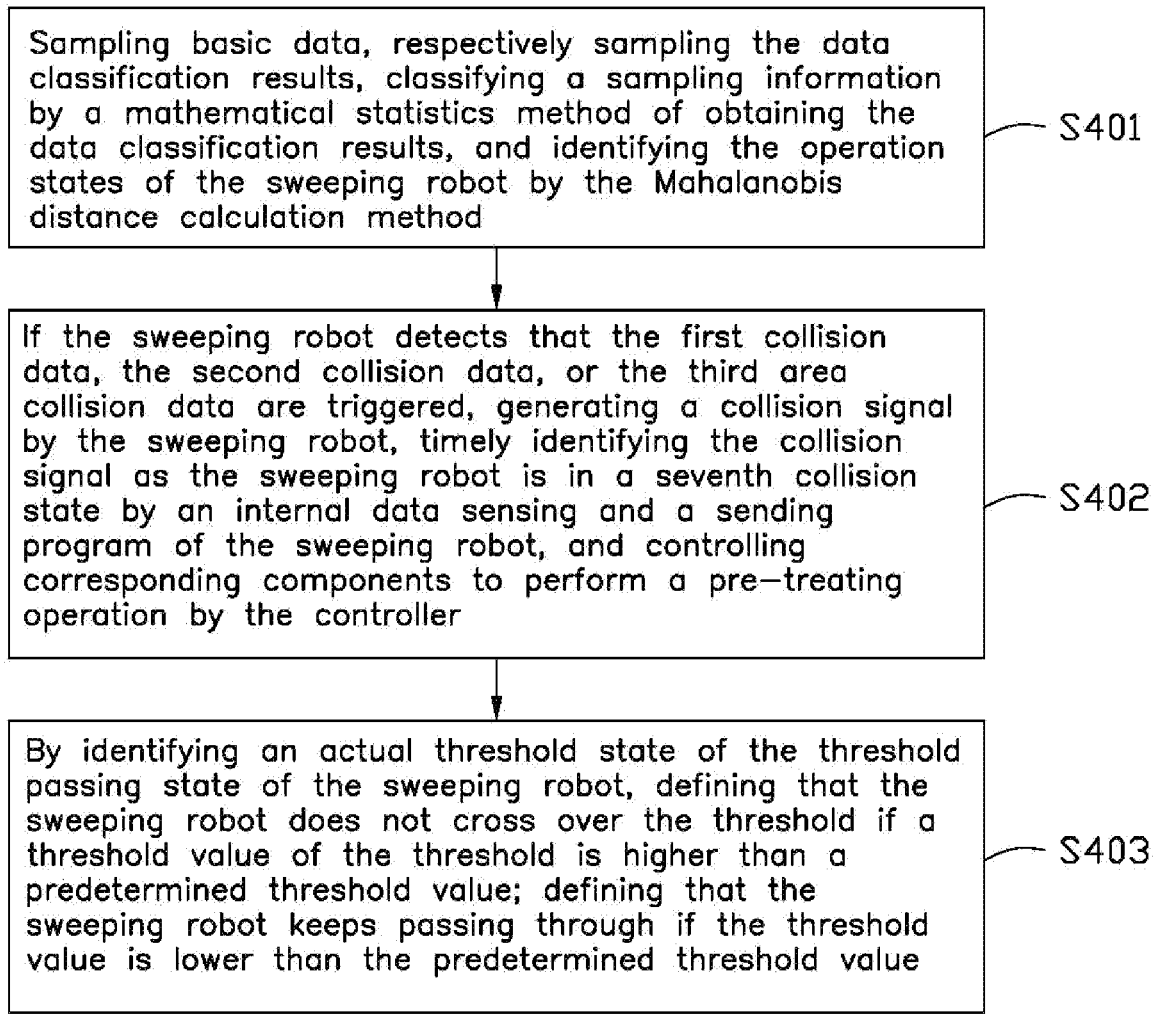
FIG. 4 is a schematic flow diagram of steps 401-403 included in the step 4 of the sweeping robot obstacle avoidance treatment method based on free move technology of the present disclosure.

As shown in FIGS. 1-4, the present disclosure provides an anti-collision detection method for sweeping robots, including following steps:

step 1: predetermining a sweeping robot provided with a six-axis gyroscope, a grating signal sensor, and a left-and-right-wheel power sensing unit;

step 2: performing a real-time sensing and data acquisition on an operation state of the sweeping robot by utilizing the six-axis gyroscope, the grating signal sensor, and the left-and-right wheel electric quantity sensing unit to obtain a real-time data information; wherein the real-time data information includes collision state of the sweeping robot, non-obstacle operation state, threshold passing state, and pushing-obstacle operation state;

step 3: collecting a data point every 10 ms from the real-time data information; and performing data classification on collected data points by a Mahalanobis distance calculation method and a sample comparison method; a data classification result includes top left-side area collision data, top middle area collision data, top right-side area collision data, middle-bottom left-side area collision data, middle bottom middle area collision data, middle bottom right-side area collision data, over-threshold lower than 5 mm height data, over-threshold 5 mm-10 mm height data, over-threshold 10-15 mm height data, and over-threshold higher than 15 mm height data;

step 4: further performing feature analysis on the data classification result in the step 3, determining identified real-time operation states of the sweeping robot according to characteristic curve of six-axis gyroscope in different collision states combined with mathematical classification statistics results; the real-time operation states of the sweeping robot include a top left-side area collision state, a top middle area collision state, a top right-side area collision state, a middle bottom left-side area collision state, a middle bottom middle area collision state, a middle bottom right-side area collision state, an over-threshold lower than 5 mm height state, an over-threshold 10 mm height state, and an over-threshold higher than15 mm height state;

step 5: sending the real-time operation states to a controller; controlling an operation of the sweeping robot by the controller to realize effective obstacle avoidance and blockage prevention of the sweeping robot according to data and information of real-time operation states received and processed by the controller; and step 6: completing a sweeping robot obstacle avoidance treatment method based on free move technology.

A specific operational analysis process includes following steps.

Preparation work is as following: constructing a sample matrix, X is an M*12 matrix, and Y is an N*1 matrix. The matrix X is a large amount of experimental data obtained through manual collection. M represents the number of samples. A single sample includes 12 elements. The 12 elements are six gyroscope data from the six-axis gyroscope, four current voltage data from the grating signal sensor, and two grating data from the left-and-right-wheel electric quantity sensing unit). Elements of the matrix Y are 0 and 1 and represent probability of possible occurrence. N is a number of required categories, and respectively represents collision left, collision, collision right, top clamping and collision avoidance.

For example: when the Y=[1,0,0,0,0], the N represents the category of "collision left".

Considering about computing capability of a microcontroller and a three-layer neural network framework generally represents a vast majority of functions, the present disclosure constructs three-layer neural network: Y=(X*W1+B1)*W2+B2.

The present disclosure assumes that the function of the three-layer neural network represents a function relationship between X and Y. Then a target is turned to obtain the matrices W1, B1, W2, and B2 when values of X and Y are given. Thus, corresponding Y values are obtained by substituting a set of X sample values.

A gradient descent method is applied to perform iterative convergence to obtain the matrices W1, B1, W2, and B2, which is shown as following.

Randomly initializing a set of weights W and offset B; substituting into a sample set X; and obtaining a classification result Yp.

Yp is different from a real value Y; representing difference between the Yp and the real value Y by means of cross-entropy loss, LOSS=−[Y log Yp+(1−Y) log (1−Yp)]; the cross-entropy loss utilizes a characteristic that Y are 1 and 0; when a predicted value Yp is 0/1, the real value Y is 1/0, the LOSS is maximum; when the predicted value Yp is close to the true value Y, the LOSS is minimum; and converging the LOSS to a minimum value represents that the required weight W and the offset B are calculated.

Substituting the formula Y=(X*W1+B1)*W2+B2 into the cross-entropy loss, due to a fact that a minimum value exists in the LOSS, respectively carrying partial derivatives on the parameters W and B (a derivation process is omitted); performing a thought of gradient descent; updating $$W1 = W - L * \frac{\partial \text{LOSS}}{\partial W1}, W2 = W2 - L * \frac{\partial \text{LOSS}}{\partial W2},$$

$$B1 = B1 - L * \frac{\partial \text{LOSS}}{\partial B1}, \text{ and } B2 = B2 - L * \frac{\partial \text{LOSS}}{\partial B2};$$

L is learning rate; setting the current test to be 0.01 and substituting new parameter values into the cross-entropy loss; and continuously updating the process to obtain a local minimum value of the Loss, W1, W2, B1, and B2 are final results.

The present disclosure combines sensor data analysis and current mainstream machine learning algorithm to construct the three-layer neural network, and then obtains an operation formula suitable for the sweeping robot. The present disclosure tests by cooperating with a logic threshold correction to obtain a more accurate classification result.

Furthermore, in the step 4, the present disclosure performs feature analysis on the data classification results including sampling basic data, respectively samples the collected data classification result, classifies a sampling information by a mathematical statistics method, and identifies the operation states of the sweeping robot by the Mahalanobis distance calculation method. In the present disclosure, the data is more than 200 thousand.

Furthermore, in the step 4, when the sweeping robot detects that the top left-side area collision data, the top middle area collision data, or the top right-side area collision data are triggered, the sweeping robot generates a top collision signal and timely identifies the top collision signal as a top clamping state by an internal data sensing and a sending program. Meanwhile the controller controls corresponding components to perform a pre-treating operation by the controller.

Furthermore, in the step 4, the sweeping robot is provided with a predetermined threshold height setting value of a threshold state, the predetermined threshold height setting value is 15 mm. By identifying an actual threshold state of a threshold, if a threshold value of the threshold is higher than 15 mm, the sweeping robot does not cross over the threshold; if the threshold value is lower than 15 mm, the sweeping robot keeps passing through.

Furthermore, the Mahalanobis distance calculation method includes following steps: predetermining a value A as a vector or a matrix, and then $A^T$ represents a transposition of the value A; and setting data from $X_1$, $X_2$ to $X_3$ as m data individuals, $X_i=(X_{i1}, X_{i2} \text{ to } X_{in})$, i=1, 2 to m, and n is a number of attributes of a data individual $X_i$, and then a data population represents as $X=(X_1, X_2, X_3 \text{ to } X_m)^T$.

Furthermore, the sweeping robot 1 includes a main body 10 of the sweeping robot 1, a power source, the controller, a data storage configured to store data information, a wireless communication transmission unit 12 configured to communicate and connect with an external mobile terminal, and a water tank configured to storage water. The power source, the data storage, the wireless communication transmission unit 12, and the water tank are disposed inside the main body 10 of the sweeping robot 1. A side brush assembly and a left-right driving wheel assembly are disposed on the lower part of the main body 10 of the sweeping robot 1. A left-right wheel control driving circuit unit 16 configured to control an operation of the left-right driving wheel assembly and receive a Pulse Width Modulation (PWM) control signal from the controller, a left-right wheel speed detection circuit unit configured to detect an operation speed of the left-right driving wheel assembly in real time, and a side brush driving circuit unit configured to control an operation of the side brush assembly are respectively disposed inside the main body 10 of the sweeping robot 1. The data storage, the wireless communication transmission unit 12, the left-right wheel control driving circuit unit 16, the left-right speed detection circuit unit, the side brush driving circuit unit, and a six-axis gyroscope 14 are electrically connected with the controller.

Comparing with the prior art, the present disclosure provides the sweeping robot obstacle avoidance treatment method based on free move technology. The sweeping robot obstacle avoidance treatment method based on free move technology that defines the sweeping robot having a six-axis gyroscope as a signal sensor and defines a grating signal and a left-right wheel electric quantity as auxiliary signals, which accurately identifies four states of the sweeping robot. The four states of the sweeping robot include a collision state, an obstacle-free state, an over-threshold state, and an obstacle pushing state. Through experimental verification, accuracy of the identification of the four states of the sweeping robot reaches more than 96%, so that the sweeping robot freely sweeps at home, and keeps running without getting blocked.

Furthermore, the present disclosure identifies the collision state by a gyroscope. A detection sensitivity of collision of the sweeping robot is predetermined by a software, such that bottom collision, machine body collision, and top collision of the sweeping robots are identified. The sweeping robot effectively bypasses the obstacles if it detects that the obstacles cannot be crossed from the top or the sweeping robot may be sandwiched by the obstacle. Thus, the sweeping robot avoids the bottom collision and the top collision, the sweeping robot has high-sensitivity detection, so a collision intensity is small, the avoidance is more active. Further, the sweeping robot is not easy to get stuck, and an effect of crossing obstacles is more obvious, comparing a gyroscope detection method with a mechanical detection method, anti-blocking efficiency of the gyroscope detection method is improved by 60%, and detrapping efficiency is improved by 50%.

The embodiments of the present disclosure do not limit the protection scope of the present disclosure. Any modification, equivalent replacement and improvement made within the spirit and principle of the present disclosure should be included within the protection scope of the claims of the present disclosure.

What is claimed is:

1. A sweeping robot obstacle avoidance treatment method based on free move technology, comprising following steps:

step 1: predetermining a sweeping robot provided with a six-axis gyroscope, a signal sensor, and a power sensing unit to sense power of a left wheel and a right wheel of the sweeping robot;

step 2: performing a real-time sensing and data acquisition on a real-time operation state of the sweeping robot by utilizing the six-axis gyroscope, the signal sensor, and the power sensing unit to obtain real-time data;

step 3: collecting a large amount of original data of each operation state of the sweeping robot, and performing classification on the large amount of the original data by a Mahalanobis distance calculation method and a sample comparison method to obtain data classification results; wherein the data classification results comprise: a first collision data, a second collision data, a third collision data, a fourth collision data, a fifth collision data, a sixth collision data, a first height data, a second height data, a third height data, and a fourth height data; the operation state of the sweeping robots comprise: a collision state of the sweeping robot, a non-obstacle operation state, a threshold passing state, and a pushing-obstacle operation state;

wherein the Mahalanobis distance calculation method comprises following steps:

predetermining a value A as a vector or a matrix, and then $A^T$ represents a transposition of the value A;

setting data from X1, X2 to Xm as m data individuals, wherein Xf=(X11, X12 to Xin), i=1, 2 to m, and n is a number of attributes of a data individual Xf, and then a data population represents as $X=(X1, X2, X3 \text{ to } Xm)^T$;

wherein a specific calculation formula of obtaining the data classification results is as follows: Y=(X*W1+B1)*W2+B2; constructing a sample matrix, wherein X is an M*12 matrix, and Y is an N*1 matrix; the matrix X is a large amount of experimental data obtained through the data classification on the large amount of the original data, M represents a number of samples, a single sample comprises 12 elements; the 12 elements are six gyroscope data from the six-axis gyroscope, four current voltage data from the power sensing unit, and two grating data from the signal sensor; elements of the matrix Y are 0 and 1 for representing probability of occurrence; N is a number of required categories representing a first collision, a second collision, a third collision, a fourth collision, and none of collision; a specific calculation process of obtaining the data classification results is as follows:

A. randomly initializing a set of weights W and offset B, and substituting into the matrix X to obtain a classification result Yp different from a real value Y;

B. representing difference between the Yp and the real value Y by means of cross-entropy loss, wherein LOSS=−[Y log Yp+(1−Y) log (1−Yp)]; the cross-entropy loss utilizes a characteristic that Y are 1 and 0; when a predicted value Yp is 0/1, the real value Y is 1/0, the LOSS is maximum; when the predicted value Yp is close to the real value Y, the LOSS is minimum; converging the LOSS to a minimum value represents that the required weight W and the offset B are calculated;

C. substituting the formula Y=(X*W1+B1)*W2+B2 into the cross-entropy loss, due to a fact that a minimum value exists in the LOSS, respectively carrying partial derivatives on the parameters W and B; performing a thought of gradient descent; updating $$W1 = W - L*\frac{\partial \text{LOSS}}{\partial W1}, W2 = W2 - L*\frac{\partial \text{LOSS}}{\partial W2},$$
$$B1 = B1 - L*\frac{\partial \text{LOSS}}{\partial B1}, \text{ and } B2 = B2 - L*\frac{\partial \text{LOSS}}{\partial B2};$$

L is learning rate 0.01; and substituting new parameter values into the cross-entropy loss; continuously updating to obtain a local minimum value of the Loss, W1, W2, B1, and B2 are final results;

step 4: based on specific calculation formula Y=(X*W1+B1)*W2+B2 obtained in the step 3, calculating the real-time data to determine where the real-time operation states of the sweeping robot comprise a first collision state, a second collision state, a third collision state, a fourth collision state, a fifth collision state, a sixth collision state, a first height state, a second height state, and a third height state; wherein further comprising a step as following: the sweeping robot is provided with a predetermined threshold height value of the threshold passing state of the sweeping robot; by identifying an actual threshold state of a threshold, defining that the sweeping robot does not cross over the threshold if a threshold value of the threshold is higher than the predetermined threshold height value; defining that the sweeping robot keeps passing through if the threshold value of the threshold is lower than the predetermined threshold height value;

step 5: sending the real-time operation states to a controller; controlling an operation of the sweeping robot by the controller to realize effective obstacle avoidance and blockage prevention of the sweeping robot according to the real-time operation states; and step 6: completing the sweeping robot obstacle avoidance treatment method based on free move technology.

2. The sweeping robot obstacle avoidance treatment method based on free move technology according to claim 1, wherein in the step 4, if the sweeping robot detects that the first collision data, the second collision data, or the third collision data are triggered, generating a top collision signal by the sweeping robot, timely identifying the top collision signal as the sweeping robot is in a seventh collision state by an internal data sensing and a sending program of the sweeping robot, and controlling corresponding components to perform a pre-treating operation by the controller.

3. The sweeping robot obstacle avoidance treatment method based on free move technology according to claim 1, wherein the sweeping robot comprises a main body of the sweeping robot, a power source, the controller, a data storage configured to store data information, a wireless communication transmission unit configured to communicate and connect with an external mobile terminal, and a water tank configured to store water, the power source, the data storage, the wireless communication transmission unit, and the water tank are disposed inside the main body of the sweeping robot; a side brush assembly and a left-right driving wheel assembly are disposed on the lower part of the main body of the sweeping robot; a left-right wheel control driving circuit unit configured to control an operation of the left-right driving wheel assembly and receive a Pulse Width Modulation (PWM) control signal from the controller, a left-right wheel speed detection circuit unit configured to detect an operation speed of the left-right driving wheel assembly in real time, and a side brush driving circuit unit configured to control an operation of the side brush assembly are respectively disposed inside the main body of the sweeping robot; the data storage, the wireless communication transmission unit, the left-right wheel control driving circuit unit, the left-right speed detection circuit unit, the side brush driving circuit unit, and the six-axis gyroscope are electrically connected with the controller.

4. The sweeping robot obstacle avoidance treatment method based on free move technology according to claim 1, wherein when the Y matrix=[1,0,0,0,0], the N represents the first collision.

* * * * *